United States Patent
Tsai et al.

(10) Patent No.: US 6,192,420 B1
(45) Date of Patent: Feb. 20, 2001

(54) CONTROLLER WITH A VENDOR/PRODUCT IDENTIFICATION PIN FOR A UNIVERSAL SERIAL BUS BY VARIOUS MANUFACTURERS

(75) Inventors: Chuan-Ching Tsai; Joseph Gee, both of Taipei; Chun-Min Wu, Taipei Hsien; Chen-Yuan Liao, Tao Yuan Hsien, all of (TW)

(73) Assignee: Weltrend Semiconductor Inc., Hsin-Chu (TW)

( * ) Notice: Under 35 U.S.C. 154(b), the term of this patent shall be extended for 0 days.

(21) Appl. No.: 09/119,377

(22) Filed: Jul. 20, 1998

(30) Foreign Application Priority Data

Aug. 9, 1997 (TW) ................................. 86213537

(51) Int. Cl.$^7$ ................................. G06F 13/00
(52) U.S. Cl. ................. 710/10; 710/8; 710/62; 710/63; 710/104
(58) Field of Search ............... 710/8, 9, 10, 104, 710/62, 63; 395/500, 861, 882

(56) References Cited

U.S. PATENT DOCUMENTS

| | | | |
|---|---|---|---|
| 4,773,005 | * 9/1988 | Sullivan | 710/9 |
| 5,317,693 | * 5/1994 | Cuenod et al. | 710/9 |
| 5,404,460 | * 4/1995 | Thomsen et al. | 710/9 |
| 5,774,114 | * 6/1998 | Suzuki | 345/157 |
| 5,860,028 | * 1/1999 | Pecore | 395/861 |
| 5,905,370 | * 5/1999 | Bryson | 323/283 |
| 5,987,548 | * 11/1999 | Dixon | 710/104 |
| 5,991,546 | * 11/1999 | Chan et al. | 395/882 |
| 6,012,103 | * 1/2000 | Sartore et al. | 710/8 |

* cited by examiner

*Primary Examiner*—Thomas C. Lee
*Assistant Examiner*—Tammara Peyton
(74) *Attorney, Agent, or Firm*—Christensen O'Connor Johnson Kindness PLLC

(57) ABSTRACT

A Universal Serial Bus (USB) controller with a VIDS pin to set up a plurality of vendor identification which can be accompanied with interface and software program. Thus, one chip can achieve Vendor ID/Product ID (VID/PID) of $2^N$ types (N is a positive integer equal to or greater than 1) in accordance with various USB manufactures and products.

4 Claims, 4 Drawing Sheets

CONTROLLER WITH A VENDOR/PRODUCT IDENTIFICATION PIN FOR A UNIVERSAL SERIAL BUS BY VARIOUS MANUFACTURERS

DESCRIPTION OF THE INVENTION

1. Field of the Invention

This invention relates to an integrated circuit for the controller of a Universal Serial Bus.

2. Background and Prior Art of the Invention

The rapid development of personal computers capable of a wide range of applications, ranging from multi-media technology and network connections, to ISDN, has resulted in difficulties for ordinary users in the setup of hardware interfaces and software programs. The difficulties are due to the incompatibility of hardware interfaces for each mouse, keyboard, monitor, printer, sound card, ISDN, etc.

In view of the above problem, well-known manufacturers including Microsoft, Intel, IBM, DEC, Compaq, NEC, Nortel, and other international companies, have jointly set up an open type framework organization to establish the standards for the USB, with the issue of edition 1.0 of its specifications in January 1996. These specifications are applicable to personal computers with a PC framework. Microsoft has adhered to the USB as the standard for performance in the new edition of their Windows operation system, Windows 98. In addition, major manufacturers of the mother board have included USB interfaces in their products.

In response to the above specifications, manufacturers of the known art have provided their products with various types of USB controllers, such as the USB keyboard controller, USB mouse controller, USB hub controller, etc.

The present invention provides a readable VID/PID technique that can be applied to various types of products which satisfy USB specifications.

According to USB specifications, in order for the peripheral output/input equipment of a PC system to be provided a function of plug and play as the goal, each function should be provided with VID/PID for identification by the PC. Since VID from different manufacturers of USB products are not identical (for example, company A and company B produce compatible USB keyboards which in different VID), even the same series of products by the same brand may have different PID (such as in USB keyboards, where the scanning method and language may differ and lead to different PID). The design used in this invention allows for the initial assembling of $2^N$ types ($N \geq 1$) of VID/PID, and then uses VIDS pins in conjunction with a software program and interface control to select the setting/reading of the VID/PID. The features of this design are not defined in edition 1.0 of the USB specifications. The addition of the function will make the design more versatile in meeting the demands of manufacturers who use the USB controller when producing computer peripheral equipment which have USB functions (for example, in the production of a USB keyboard, USB mouse, and USB hub controller). In order to meet the needs of general USB controllers, the present invention requires all USB product designs and manufacturers to provide only one kind of product for every usage. This will significantly lower inventory risks and production costs.

Currently, manufactures of USB controllers utilize three types of VID/PID designs. The present invention has an innovative design with low cost and superb function as its defining features. The advantages and differences of this invention over known art (for example, those using USB keyboard controllers) are shown in Table 1.

TABLE 1

Design Mode and Cost Analysis of VID/PID

| | Product design | Basic USB function | Ability to differentiate VID/PID for advanced/ intelligent USB functions | Cost | Description |
|---|---|---|---|---|---|
| 1 | This Invention | Yes | Yes | Low | The USB keyboard controller includes not only all USB functions but also a storage ability of $2^N$ types for various VID/PIDs. It significantly lowers production costs and inventory risks. |
| 2 | One from known art | Yes | Yes | High | The USB keyboard controller includes only USB functions. A serial EEPROM is required for different VID/PIDs. Currently, the cost of serial EEPROM is 30~50% of a USB keyboard controller. |
| 3 | Another known art | Yes | No | Middle | The USB keyboard controller includes only one set of VID/PID. The contents must be fixed before semiconductor production, leaving no flexibility for changes in manufacturing keyboards. Furthermore, it cannot provide appropriate USB keyboard controllers on keyboard production change. |

It is apparent that the series of USB controllers designed by the present inventor have a unique design and superb functional capacities, in addition to having low cost and being the most competent in performance.

DETAILED DESCRIPTION OF THE INVENTION

Figure 1:
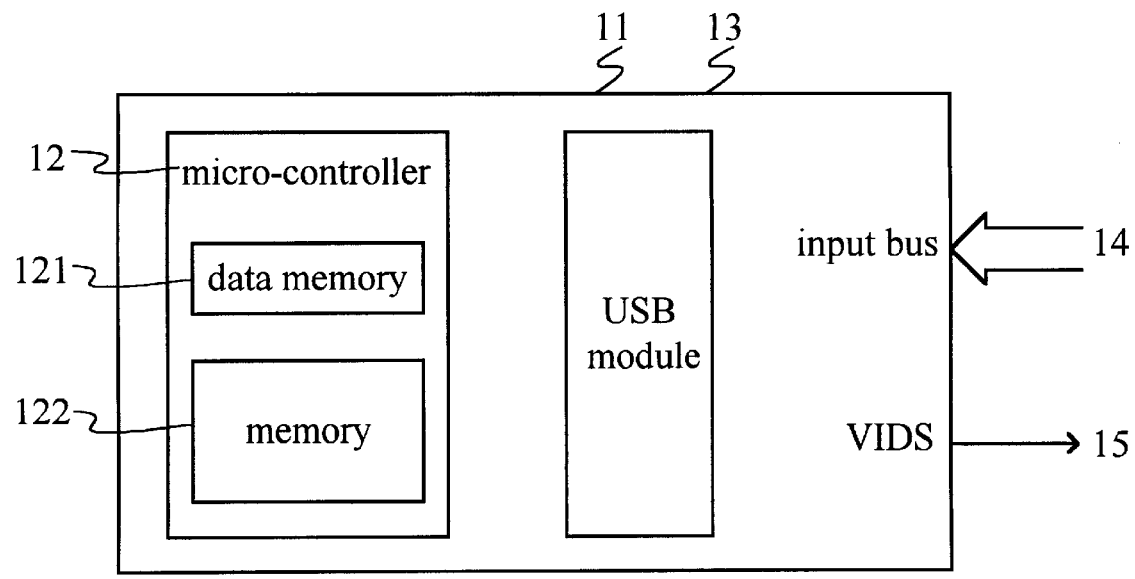
FIG. 1 is a block diagram showing the functions of the USB controller of the present invention.

FIG. 1 is the block diagram of a Universal Serial Bus ('USB') controller (11) of the present invention. The controller comprises a micro-controller (12), a USB module (13), an input bus (14), and a VIDS pin as an output pin to set up a plurality of vendor and product identification code. The micro-controller (12) contains a data memory (121) and non-volatile memory (122) for recording VID/PID from various manufacturers and products, and other relevant information.

Figure 2:
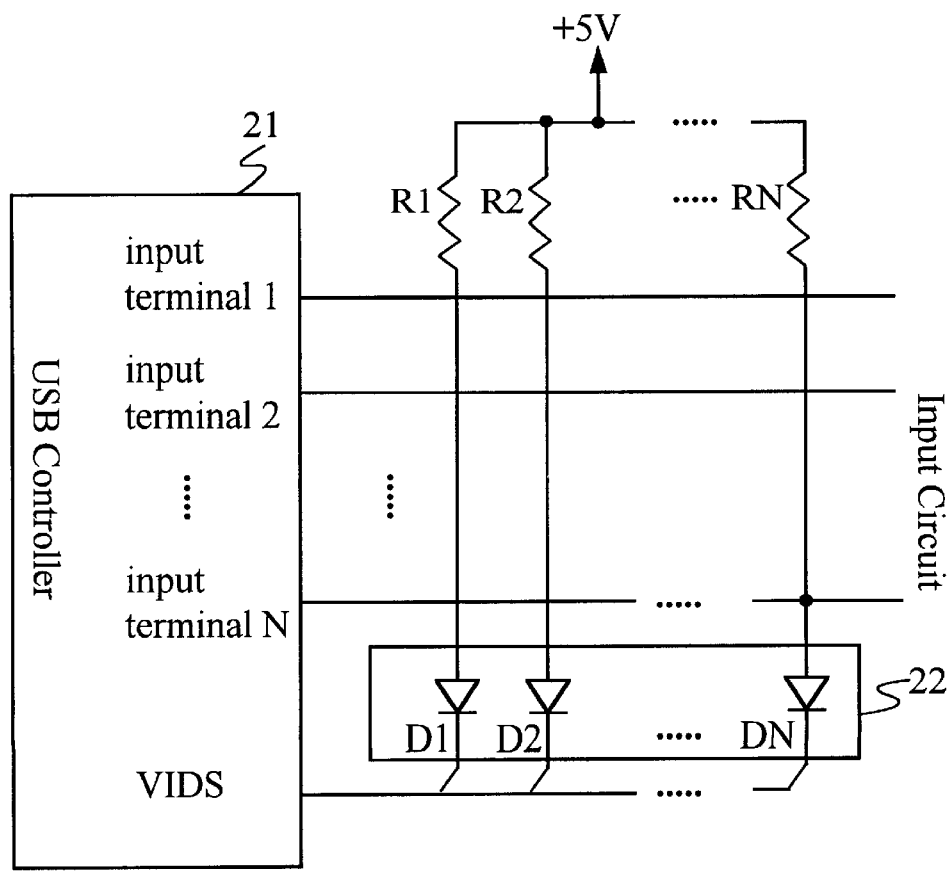
FIG. 2 is a preferred embodiment of the integrated circuitry of a USB controller of the present invention.

FIG. 2 shows a preferred embodiment of the USB controller of the present invention. The terminals 1,2, . . . N of the USB controller (21) are connected via resistors R1, R2, . . . RN, to a higher voltage level (in this embodiment, +5V). Under these conditions, the terminals 1, 2, . . . N, are pulled high. At the same time, terminals 1,2 . . . N are connected through the interface (22) (in this case formed from diodes D1, D2, . . . DN) to the VIDS pin which serve as an output pin. In this embodiment, under ordinary conditions, the output voltage level of VIDS pin is high. Only on the setting/reading values of the VID/PID in the USB controller, the output voltage level is changed to a low level. Thus, the is stored in the memory (121) as VendorSelect variable. In the following block (33), the voltage level of VIDS pin is set at a high level. In the final block (34), VendorSelect variable is used as an index to determine the correct codes of VID and PID and other relevant information stored in the memory (122).

EXAMPLES AND DESCRIPTION OF APPLICATION PROGRAMS

Figure 3:
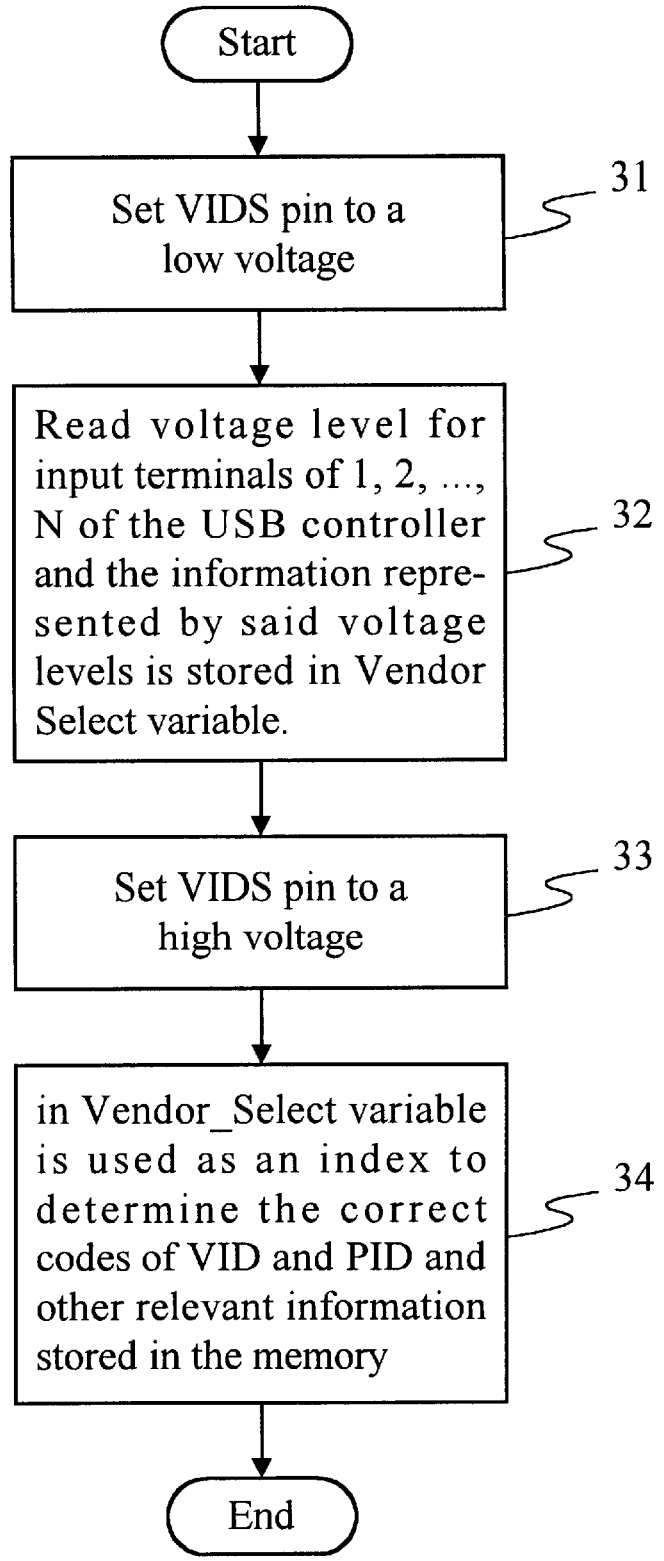
FIG. 3 is the flowchart of program control based on the present invention.

Using the preferred embodiment shown in FIG. 2 as an example, the reading of VID/PID by C-language is conducted as follows:

After the device is powered on the following steps are to be executed:

Block (31) in FIG. 3:

```
            VIDS=0;          /* Set VIDS pin at low voltage level                         */
Block (32) in FIG. 3:
            VendorSelect=SI;    /* Read the voltage level from the input terminals, and */
                             /* store the values in variable VendorSelect.               */
                             /* The number of pins at input terminals are not limited.   */
                             /* when the number of pins (N) increases,                   */
                             /* the options for VID/PID selection will increase by 2^N;  */
                             /* The SI is the voltage level read                         */
                             /* from input terminals.                                    */
Block (33) in FIG. 3:
            VIDS=I           /* Set VIDS pin at high voltage level. After that,          */
                             /* pins of input terminals are available for other uses     */
Block (34) in FIG. 3:
            VID=VIDtable[VendorSelect];
            PID=PIDtable[VendorSelect];
                /* Use variable VendorSelect as the VID */
                /* and PID indices to select one of the listed values of */
                /* VID and PID.*/
                /* An example is listed as follows: */
                /* 1. Company A, with VID=046E and PID=0100, is saved as index 1   */
                /* 2. Company B, with VID=04A5 and PID=0001, is saved as index 2   */
                /* 3. Company C, with VID=0433 and PID=ABAB, is saved as index 3   */
                /* If diode for terminal 1 of FIG. 2 is removed, /
                /* then by the above step, VendorSelect=1, VID=046E, PID=0100. */
    /* If diodes for terminals 1 and 2 of FIG. 1 are removed,*/
                     /* then by the above step; VendorSelect=3, VID=0433, PID=ABAB. */
``` manufacturer or designer can use the installation of diodes D1, D2, . . . DN to obtain $2^N$ combinations. Once the VIDS is at a low voltage level, the input terminals with diodes can be set at a low level. Input terminals without being installed diodes maintain a high voltage level that is originally pulled high. In other words, by setting the VIDS pin at a low voltage level with or without the diodes D1, D2, . . . DN installed to set the values of input terminals 1, 2, . . . N, one of $2^N$ type combinations (decided by the diodes D1, D2, . . . DN) is obtained.

The concept of this invention can be modified by those skilled in the art. For instance, the setting of VIDS pin at low voltage level can be altered to high voltage level, or one or more pins of VIDS can be used, etc., without departing from the intent and purpose embodied in the present invention.

Figure 4:
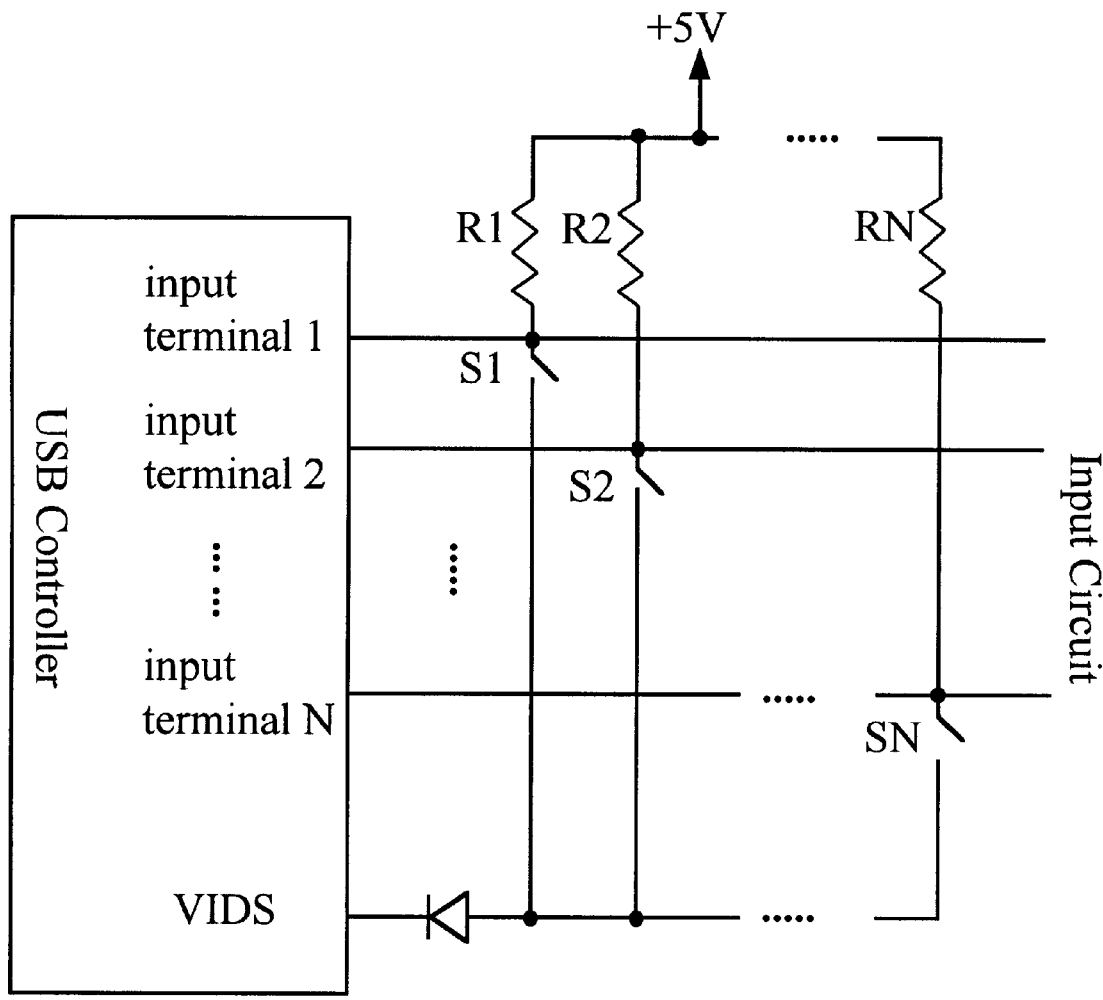
FIG. 4 is another preferred embodiment of the present invention.
Figure 5:
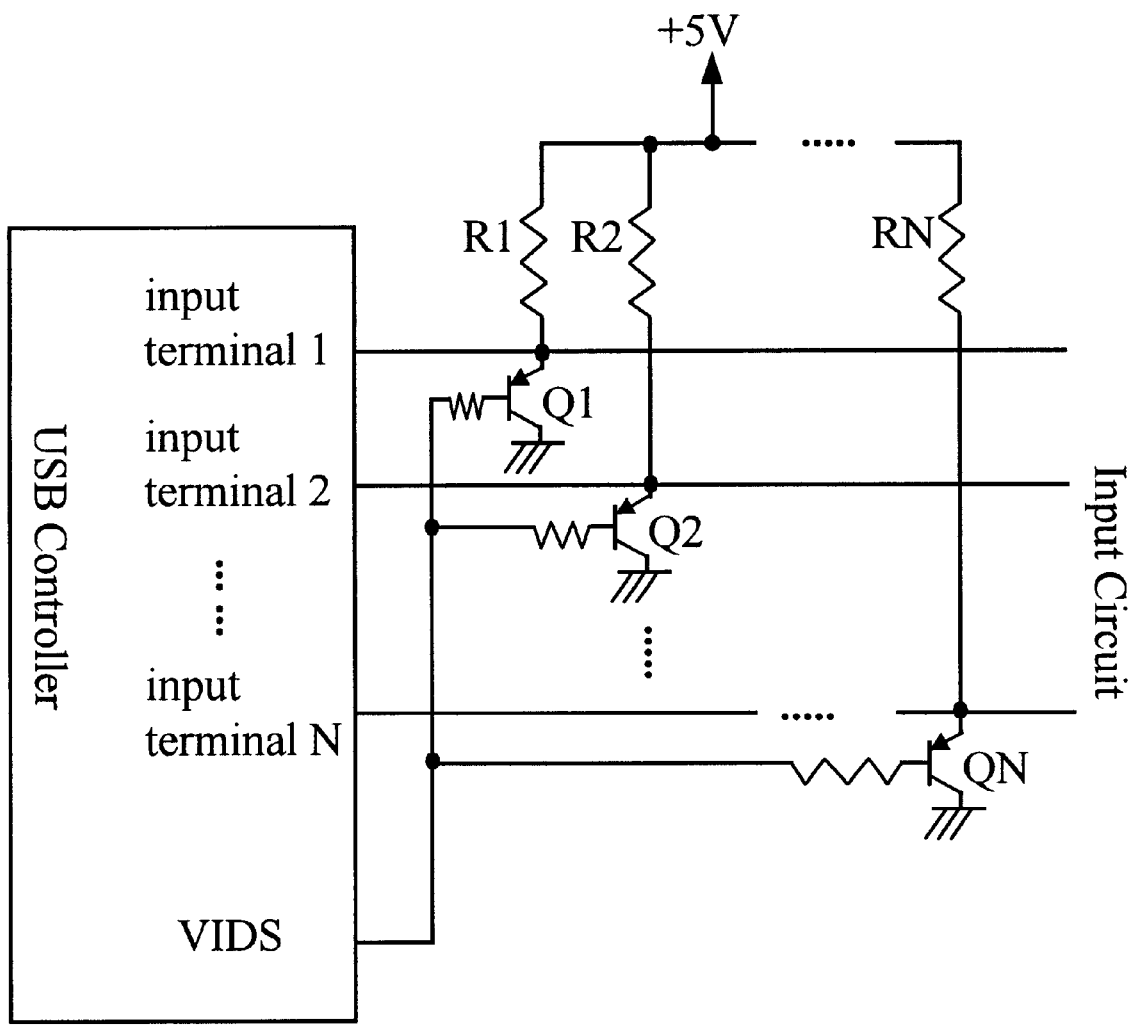
FIG. 5 is still another preferred embodiment of the present invention.

FIG. 3 shows the flow chart corresponding to the program control. The first block (31) shows the setting of low voltage level for VIDS pin. In the next block (32), the voltage levels for input terminals of 1,2 . . . N in the USB controller are read, and the information represented by said voltage levels FIGS. 4 and 5 respectively show other preferred embodiments, in which the diodes of D1, D2, . . . DN of the interface in FIG. 2 have been respectively replaced by the switches S1, S2, . . . SN (as shown in FIG. 4); or by transistors Q1, Q2, . . . QN (as shown in FIG. 5). Since the underlying functional principles are similar to those of FIG. 2, a secondary discussion has been waived.

The present invention has been described by the above embodiments. It should be noted that those skilled in the art can easily apply the techniques and other features of the present invention when making relevant changes.

What is claimed is:

1. A Universal Serial Bus controller, comprising of:

a memory system storing a plurality of VID and PID codes;

N input terminals, where N is equal to or greater than 1;

an interface connected to the N input terminals; and a VIDS pin connected to said interface to set up the value of the N input terminals, said value being stored as VendorSelect variables to be used as indices for obtaining correct VID and PID codes and other relevant information stored in said memory.

2. The Universal Serial Bus controller as claimed in claim 1, wherein the interface comprises N diodes.

3. The Universal Serial Bus controller as claimed in claim 1, wherein the interface comprises N switches.

4. The Universal Serial Bus controller as claimed in claim 1, wherein the interface comprises N transistors.

* * * * *